(12) United States Patent
Yang et al.

(10) Patent No.: US 7,434,958 B2
(45) Date of Patent: Oct. 14, 2008

(54) LAMP FIXING MEMBER, BACKLIGHT ASSEMBLY HAVING THE SAME AND LIQUID CRYSTAL DISPLAY APPARATUS HAVING THE SAME

(75) Inventors: Yong Seok Yang, Asan-si (KR); Jung Tae Kang, Suwon-si (KR); Sang Hoon Park, Yongin-si (KR); Jin Ho Ha, Suwon-si (KR); Sang Duk Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 197 days.

(21) Appl. No.: 11/536,165

(22) Filed: Sep. 28, 2006

(65) Prior Publication Data

US 2007/0139911 A1 Jun. 21, 2007

(30) Foreign Application Priority Data

Dec. 15, 2005 (KR) .................. 10-2005-0123667

(51) Int. Cl.
*F21S 4/00* (2006.01)

(52) U.S. Cl. .................. 362/225; 362/97; 362/240; 362/249; 362/396; 24/339; 24/459; 248/541; 248/74.2; 248/222.12; 248/313

(58) Field of Classification Search .................. 362/97, 362/225, 217, 238, 240, 249, 396; 24/326, 24/335, 336, 339, 459; 248/540, 541, 74.1, 248/74.2, 22.12, 313
See application file for complete search history.

(56) References Cited

U.S. PATENT DOCUMENTS

| 1,049,402 | A | * | 1/1913 | Rydberg | .................. 248/316.4 |
| 2,631,346 | A | * | 3/1953 | Wengen et al. | .................. 248/316.4 |
| 3,856,246 | A | * | 12/1974 | Sinko | .................. 24/459 |
| 4,526,333 | A | * | 7/1985 | Nakama et al. | .................. 248/74.2 |
| 4,769,876 | A | * | 9/1988 | Platt | .................. 24/459 |
| 4,828,211 | A | * | 5/1989 | McConnell et al. | .................. 248/313 |
| 6,109,569 | A | * | 8/2000 | Sakaida | .................. 248/74.2 |
| 6,722,773 | B2 | * | 4/2004 | Tsai et al. | .................. 362/225 |
| 2005/0073858 | A1 | * | 4/2005 | Kim et al. | .................. 362/240 |
| 2006/0245186 | A1 | * | 11/2006 | Stillman | .................. 362/225 |
| 2006/0291190 | A1 | * | 12/2006 | Tsai | .................. 362/97 |
| 2007/0242446 | A1 | * | 10/2007 | Lee | .................. 362/97 |
| 2007/0291471 | A1 | * | 12/2007 | Moon et al. | .................. 362/97 |

FOREIGN PATENT DOCUMENTS

JP 2007157698 A * 6/2007
JP 2007165320 A * 6/2007

* cited by examiner

*Primary Examiner*—Ismael Negron
(74) *Attorney, Agent, or Firm*—Cantor Colburn LLP

(57) ABSTRACT

A lamp fixing member includes a first body part and a second body part. The first body part includes at least one first lamp fixing portion disposed on an upper surface of the first body part. The second body part is slidably combined with the first body part. The second body part includes a second lamp fixing portion being combined with the first lamp fixing portion and defining a space through which a lamp is inserted to be fixed.

29 Claims, 8 Drawing Sheets

LAMP FIXING MEMBER, BACKLIGHT ASSEMBLY HAVING THE SAME AND LIQUID CRYSTAL DISPLAY APPARATUS HAVING THE SAME

This application claims priority to Korean Patent Application No. 2005-123667 filed on Dec. 15, 2005, and all the benefits accruing therefrom under 35 U.S.C. §119, the contents of which are herein incorporated by reference in its entirety.

BACKGROUND OF THE INVENTION

1. Field of the Invention

The present invention relates to a lamp fixing member, a backlight assembly having the lamp fixing member and a liquid crystal display ("LCD") apparatus having the lamp fixing member. More particularly, the present invention relates to a lamp fixing member for easily and stably fixing a lamp, a backlight assembly having the lamp fixing member and a LCD apparatus having the lamp fixing member.

2. Description of the Related Art

A liquid crystal display ("LCD") apparatus, in general, displays images using liquid crystals. The LCD apparatus is a flat panel display apparatus. The LCD apparatus has various merits such as a thin thickness, a low driving voltage, low power consumption, etc. Therefore, the LCD apparatus has been widely used in various fields.

The LCD apparatus is a non-emissive typed display apparatus. Therefore, the LCD apparatus requires a backlight assembly that supplies an LCD panel with a light.

The backlight assembly includes a lamp generating light. For example, a plurality of cold cathode fluorescent lamps ("CCFLs") having a long cylindrical shape may be employed by the backlight assembly as the lamp. According of the position of the lamp, the backlight assembly is classified into an edge illumination type backlight assembly and a direct illumination type backlight assembly.

In case of the edge illumination type backlight assembly, one or two lamps are disposed adjacent to the side surface of a transparent light guide plate. The edge type backlight assembly reflects the light using one surface of the light guide plate and emits the light to the LCD panel.

In case of the direct illumination type backlight assembly, a plurality of the lamps is disposed under the LCD panel, a diffusion plate is disposed over the lamps and a reflective plate is disposed under the lamps, so that the direct type backlight assembly reflects and diffuses the light emitted from the lamps. The edge illumination type backlight assembly is used for a relatively small-screen LCD apparatus as a notebook computer, a monitor, etc. On the other hand, the direct illumination type backlight assembly is used for a large-screen LCD apparatus with a high luminance.

In case of the direct type illumination backlight assembly, according to the bigger LCD apparatus, the lamps become longer and the diffusion plate becomes bigger. Therefore, the backlight assembly includes a lamp fixing member that fixes the lamp and supports the diffusion plate.

The lamp fixing member includes a lamp fixing portion and a diffusion plate supporting portion. The lamp fixing portion fixes the lamp and the diffusion plate supporting portion supports the diffusion plate the upper part of the lamp fixing portion may have a clip shaped in a circle that is partially opened such that an opened portion is less than a diameter of the lamp.

With the structure stated above, the automated process of assembling the lamp is impossible, so that the lamp is combined with the lamp fixing member by hand. Therefore, an assembling process becomes complex and a time for assembling the backlight assembly becomes longer.

BRIEF SUMMARY OF THE INVENTION

An exemplary embodiment provides a lamp fixing member capable of easily and stably fixing a lamp.

An exemplary embodiment provides a backlight assembly having the lamp fixing member.

An exemplary embodiment provides a liquid crystal display apparatus having the lamp fixing member.

In an exemplary embodiment of a lamp fixing member, the lamp fixing member includes a first body part and a second body part. The first body part includes at least one first lamp fixing portion disposed on an upper surface of the first body part. The second body part is slidably combined with the first body part. The second body part includes a second lamp fixing portion being combined with the first lamp fixing portion to define a space through which a lamp is inserted to be fixed.

In an exemplary embodiment, the first and second lamp fixing portions have a symmetrical shape with respect to the lamp. The first lamp fixing portion includes a first combining protrusion and the second lamp fixing portion includes a first combining groove combined with the first combining protrusion by sliding of the second body part. The second body part includes a through-hole through which the first lamp fixing portion passes.

In an exemplary embodiment, the second body part may further comprise a diffusion plate supporting part that supports a diffusion plate and protruded so as to have a height larger than a height of the second lamp fixing portion.

In an exemplary embodiment of a backlight assembly, the backlight assembly includes a receiving container, a plurality of lamps and a lamp fixing member. A plurality of the lamps is arranged parallel with each other on the receiving container. The lamp fixing member is combined with the receiving container. The lamp fixing member includes a first body part and a second body part. The first body part includes at least one first lamp fixing portion disposed on an upper surface. The second body part is slidably combined with the first body part. The second body part includes a second lamp fixing portion being combined with the first lamp fixing portion to define a space through which a lamp is inserted to be fixed. The first and second lamp fixing portions have a symmetrical shape with respect to the lamp. The second body part may further comprise a diffusion plate supporting part that supports a diffusion plate.

In an exemplary embodiment of a liquid crystal display apparatus, the liquid crystal display apparatus includes a backlight assembly providing a light, a display unit being on the backlight assembly and displaying images and a top chassis fixing the display unit. The backlight assembly includes a receiving container, a plurality of lamps and a lamp fixing member. A plurality of the lamps is arranged parallel with each other on the receiving container. The lamp fixing member is combined with the receiving container. The lamp fixing member includes a first body part and a second body part. The first body part includes at least one first lamp fixing portion disposed on an upper surface. The second body part includes a second lamp fixing portion being combined with the first lamp fixing portion to define a space through which a lamp is inserted to be fixed. The first and second lamp fixing portions have a symmetrical shape with respect to the lamp. The second body part may further comprise a diffusion plate supporting part that supports a diffusion plate.

In an exemplary embodiment, the process of fixing the lamp is automated, thereby the fixing of the lamp is enhanced and the working time of fixing the lamp is reduced.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
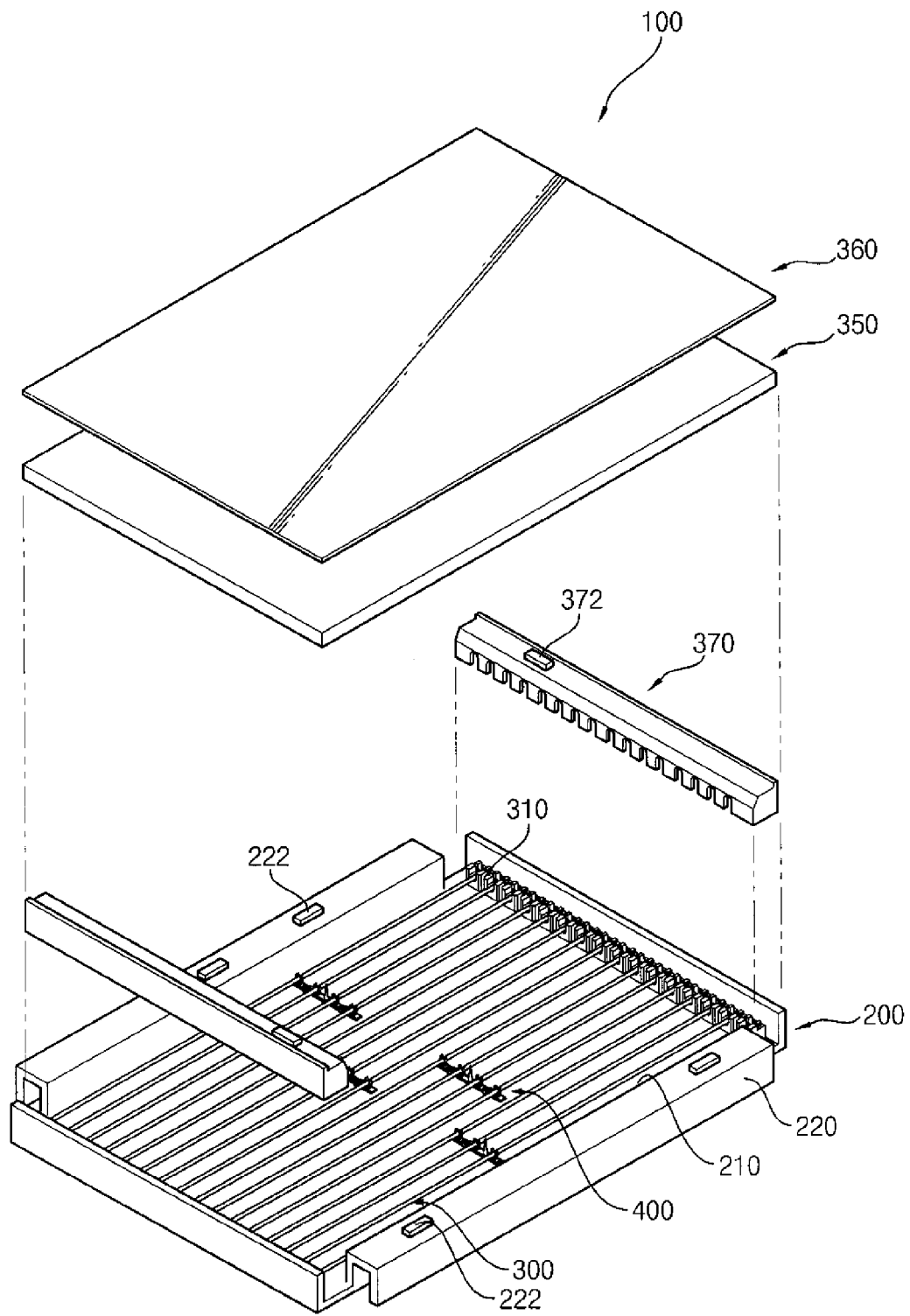
FIG. 1 is an exploded perspective view illustrating an exemplary embodiment of a backlight assembly in accordance with the present invention.

It should be understood that the exemplary embodiments of the present invention described below may be varied modified in many different ways without departing from the inventive principles disclosed herein, and the scope of the present invention is therefore not limited to these particular flowing embodiments. Rather, these embodiments are provided so that this disclosure will be thorough and complete, and will fully convey the concept of the invention to those skilled in the art by way of example and not of limitation.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions; layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the embodiments of the present invention will be described in detail with reference to the accompanied drawings.

FIG. 1 is an exploded perspective view illustrating an exemplary embodiment of a backlight assembly in accordance with the present invention.

Referring to FIG. 1, the backlight assembly 100 includes a receiving container 200, a plurality of lamps 300, a diffusion plate 350 and a lamp fixing member 400.

The receiving container 200 includes a bottom plate 210 and side walls 220. The side walls 220 extend from peripheral portions of the bottom plate 210, respectively, so that the bottom plate 210 and the sidewalls 220 together provide a receiving space. The side walls 220 may be integrally formed with the bottom plate 210. In exemplary embodiments, the receiving container 200 may include a metal that has a high strength without an easy deformation thereof.

The backlight assembly 100 may further include a first diffusion plate guiding portion 222 disposed on the sidewalls 220 of the receiving container 200. In one exemplary embodiment, four of the first diffusion plate guiding portions 222 are disposed on the sidewalls 220 of the receiving container 200. The first diffusion plate guiding portions 222 guide the diffusion plate 350 to fix the diffusion plate 350 at a predetermined position on the receiving container 200.

The first diffusion plate guiding portions 222 may be disposed on two corresponding sidewalls 220 of the receiving container 200 along a direction that is substantially parallel with a longitudinal direction of the lamps 300. The first diffusion plate guiding portions 222 may be disposed at predetermined distances along an upper surface of the sidewalls 220. When the receiving container 200 has substantially a rectangular shape, the first diffusion plate guiding portions 222 may be positioned along a relatively long side of the receiving container 200. The first diffusion plate guiding portions 222 are upwardly protruded from the sidewalls 220 of the receiving container 200 so as to properly guide the diffusion plate 350 into the predetermined position on the receiving container 200.

The lamps 300 are disposed on the bottom plate 210 of the receiving container 200 and substantially in parallel with each other. The lamps 300 generate the light in response to a driving signal provided from external device (not shown). A plurality of cold cathode fluorescent lamps ("CCFLs") having a long cylindrical shape may be employed as the lamps 300. In alternative exemplary embodiments, a plurality of external electrode fluorescent lamps ("EEFLs"), each EEFL having external electrodes formed at end portions of the EEFL, may be employed as the lamps 300. Also, each of the lamps 300 may have a curved shape such as a U-shape.

The both end portions of the lamps 300 are fixed in lamp sockets 310 that are disposed on the receiving container 200.

A diffusion plate 350 is disposed over the lamps 300. The diffusion plate 350 diffuses the light provided by the lamps 300 to improve the luminance uniformity. The diffusion plate 350 may have substantially a plate shape. The diffusion plate 350 is separated from the lamps 300 to a spaced or predetermined distance.

The diffusion plate 350 includes an optically transparent material. The diffusion plate 350 may further include a light-diffusing material to diffuse the light. In one exemplary embodiment, the diffusion plate 350 may include polymethyl methacrylate ("PMMA") as the optically transparent material.

The backlight assembly 100 may further include at least one optical sheet 360 disposed on the diffusion plate 350. The optical sheet 360 changes the paths of the light diffused by the diffusion plate 350 to improve optical characteristics. The optical sheet 360 may include a prism sheet to improve the front-view luminance by condensing the light from the front direction diffused from the diffusion plate 350. The optical sheet 360 may include a diffusion sheet to further diffuse the light diffused from the diffusion plate 350 again. In exemplary embodiments, the backlight assembly 100 may further include various functional optical sheets according to optical characteristics that are required.

The lamp fixing member 400 is fixed to the bottom plate 210 to fix the lamps 300. Since the length of the lamps 300 is relatively long, the lamps 300 may be deformed or sagged. The lamp fixing member 400 supports the middle portion of the lamps 300 stably to reduce or effectively prevent the deformation and sagging of the lamps 300.

The number of the lamp fixing members 400 may be determined by the number of the lamps 300. In one exemplary embodiment, each of the lamp fixing members 400 fixes four lamps 300. As in the illustrated embodiment of FIG. 1, when the number of the lamp fixing members 400 is more than one, the lamp fixing member 400 may be disposed in a zigzag-shape in the receiving container 200 along a direction that is substantially perpendicular to the longitudinal direction of the lamps 300.

Each of the lamps 300 is fixed by one lamp fixing member 400. However, when the lamps 300 are too long, each of the lamps 300 may be fixed by more than one of the lamp fixing members 400 to reduce or effectively prevent the deformation and sagging of the lamps 300. Each of the lamp fixing members 400 may be specific distance spaced apart from each other along the longitudinal direction of the lamps 300. In this case, the lamp fixing members 400 may be disposed in a zigzag-shape along the direction that is substantially perpendicular to the longitudinal direction of the lamps 300.

The backlight assembly 100 further includes a side mold 370 that is disposed at an end portion of the lamps 300. The side mold 370 is combined with the receiving container 200 to cover the end portion of the lamps 300. The side mold 370 improves the luminance uniformity by covering the end portion of the lamps 300, which has a relatively lower luminance than other portions of the lamps 300.

The side mold 370 supports edge portions of the diffusion plate 350 disposed on the side mold 370 and guides the position of the diffusion plate 350. The side mold 370 may include a second diffusion plate guiding portion 372 that guides the position of the diffusion plate 350. The second diffusion plate guiding portion 372 is protruded from the upper surface of the side mold 370 by a predetermined height.

The backlight assembly 100 may further include a middle mold (not shown) that fixes the diffusion plate 350 and the optical sheet 360. The middle mold fixes the edge portion of the diffusion plate 350 and the optical sheet 360 when being combined with an upper portion of the receiving container 200.

Figure 2:
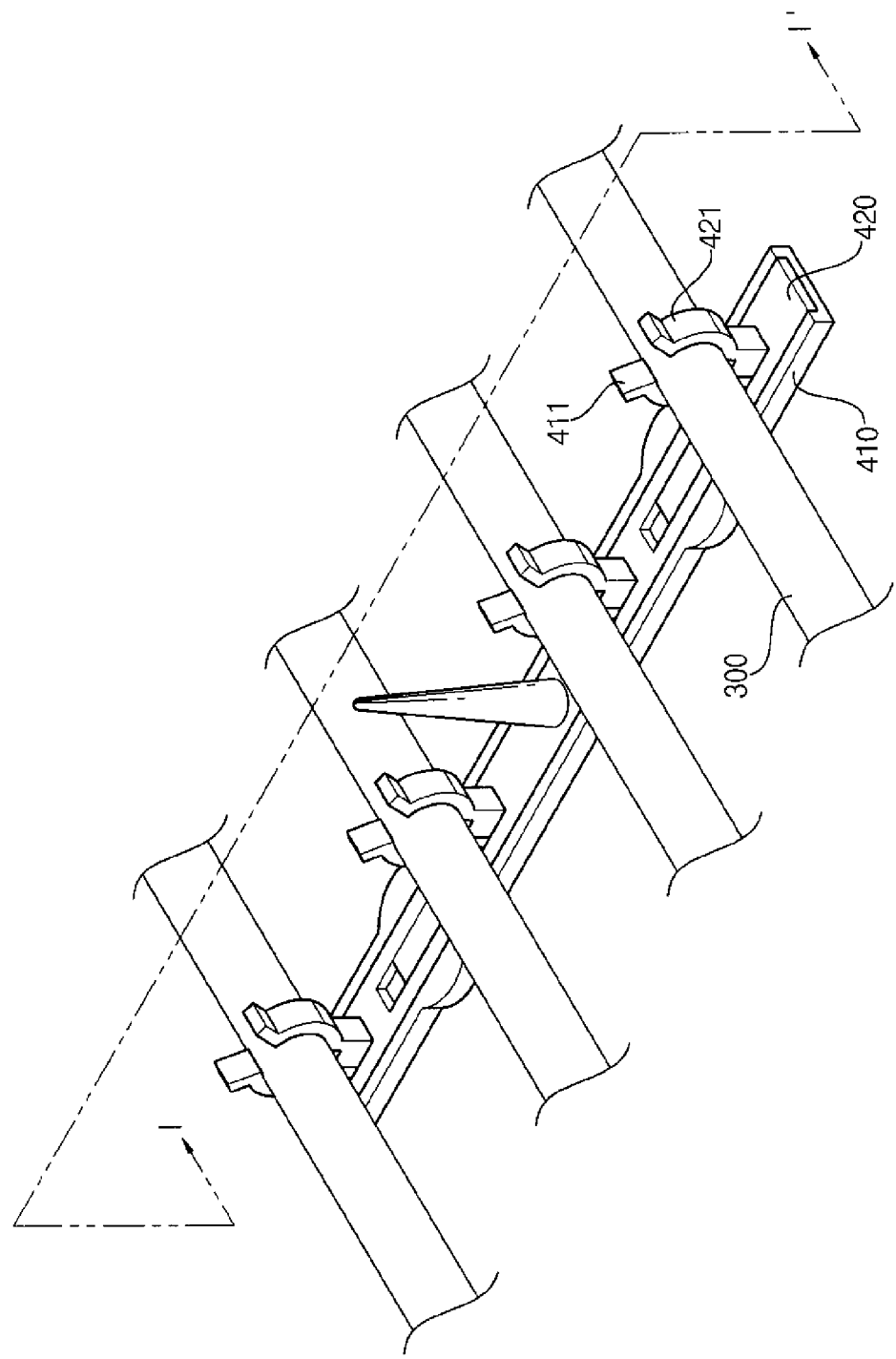
FIG. 2 is an enlarged perspective view illustrating an exemplary embodiment of a lamp fixing member of the backlight assembly in FIG. 1.
Figure 3:
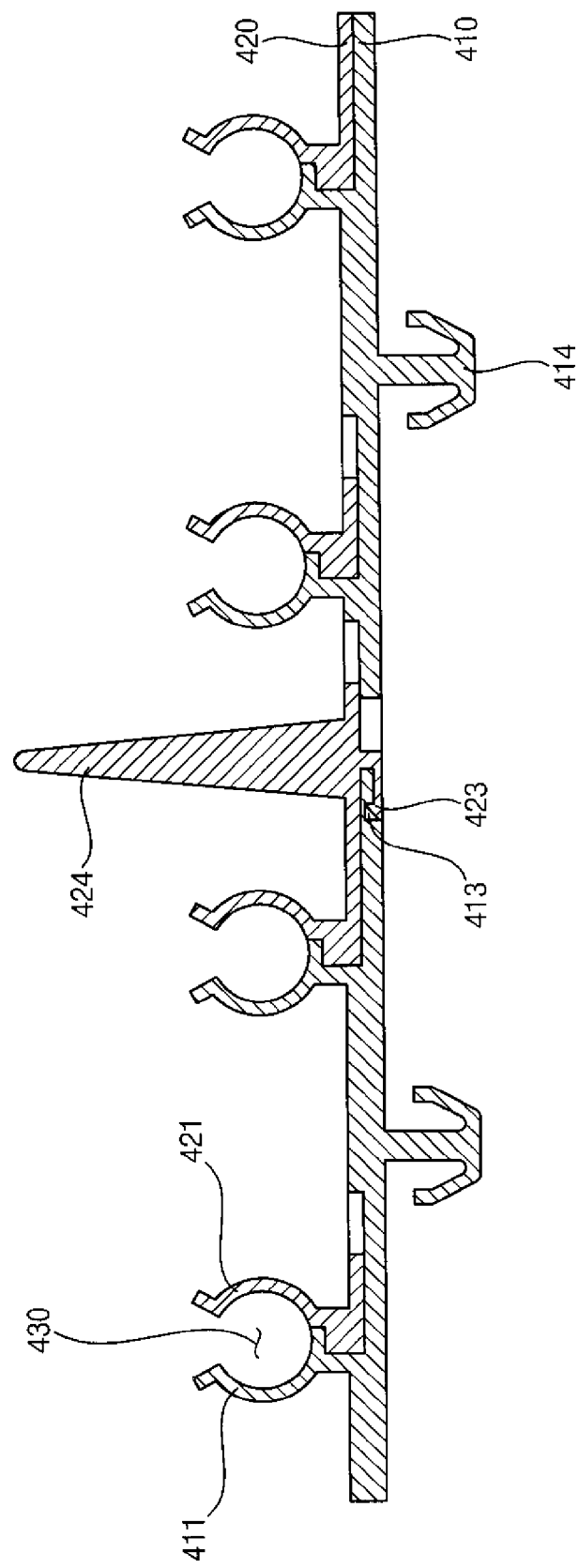
FIG. 3 is a cross-sectional view illustrating the lamp fixing member taken along line I-I' in FIG. 2.
Figure 4:
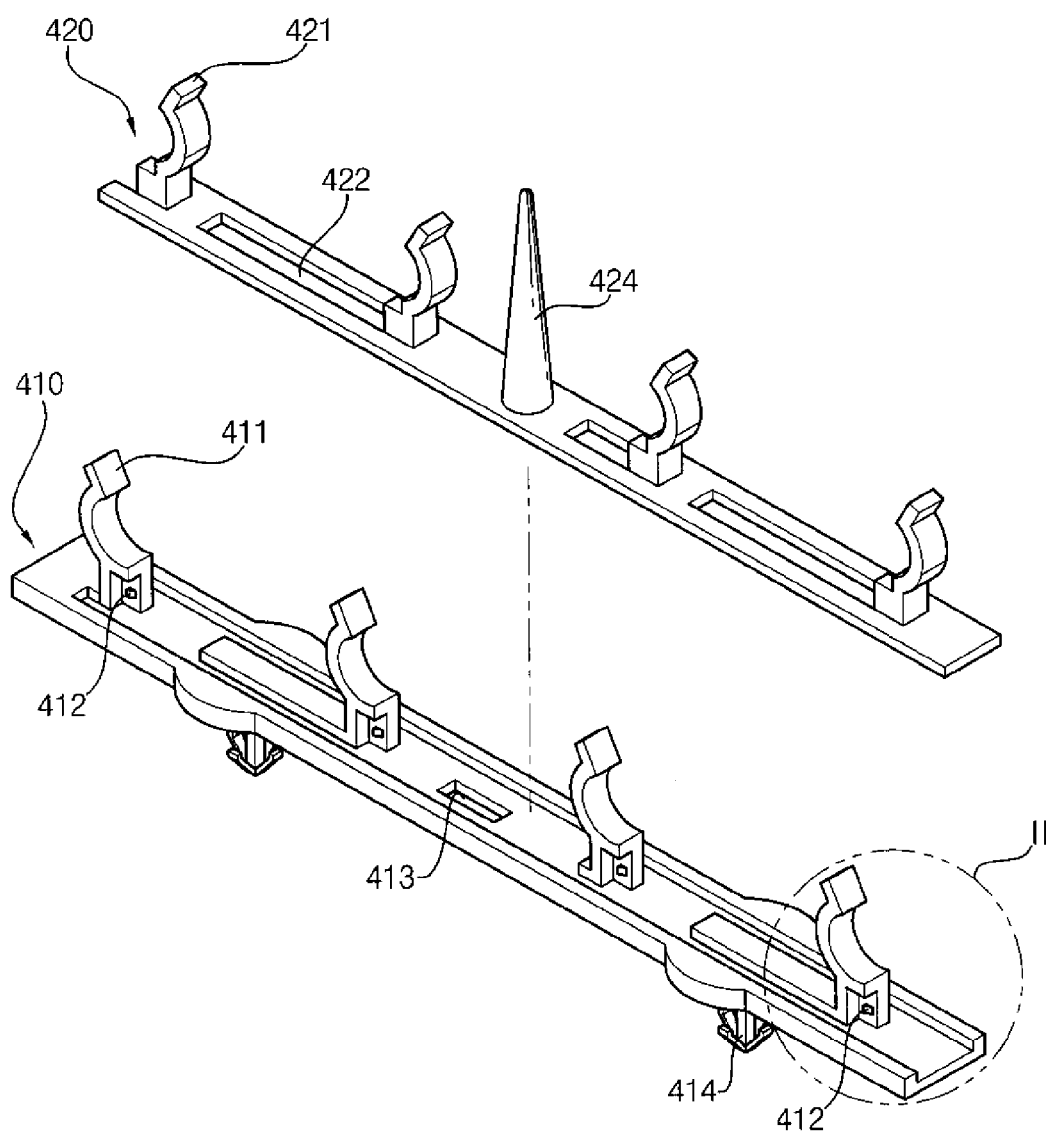
FIG. 4 is an exploded perspective view illustrating the lamp fixing member in FIG. 2.
Figure 5:
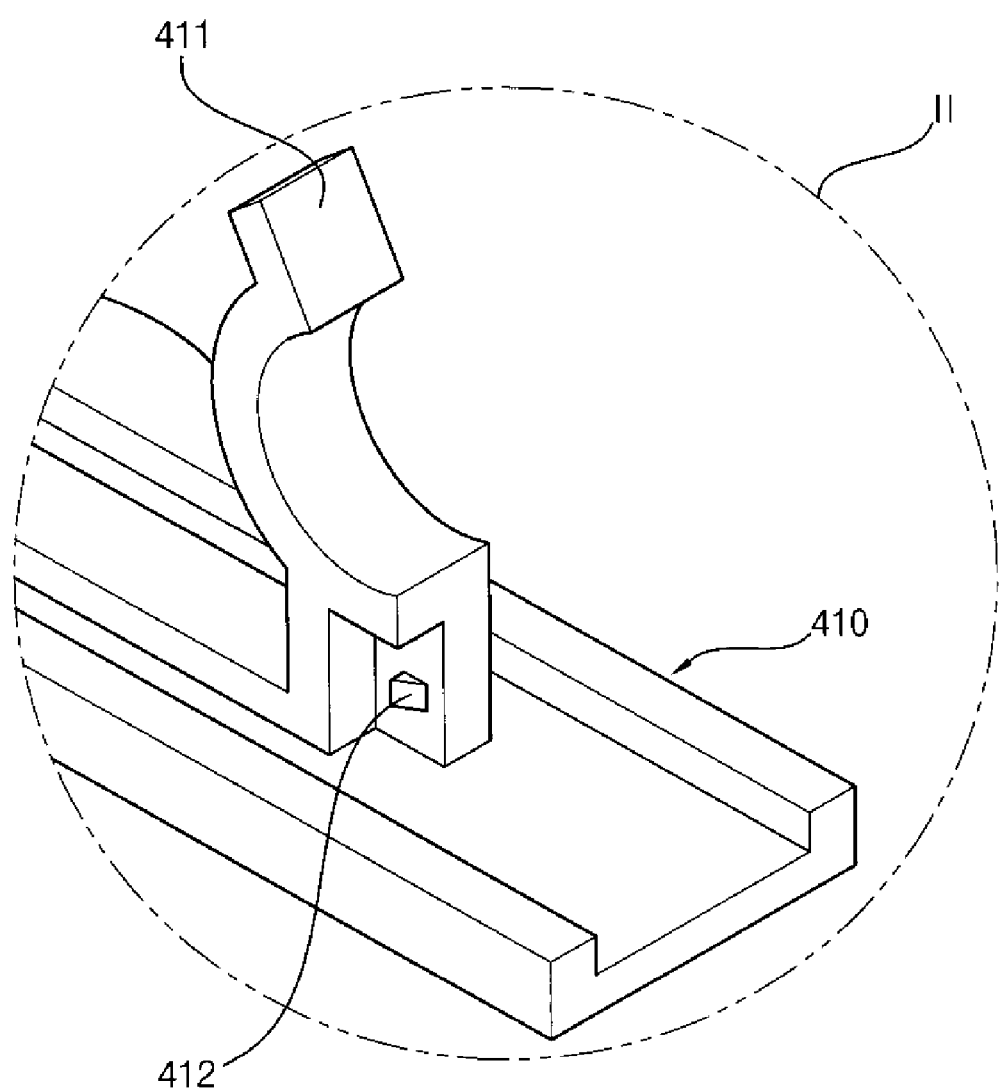
FIG. 5 is an enlarged perspective view illustrating portion of "II" in FIG. 4.

FIG. 2 is an enlarged perspective view illustrating an exemplary embodiment of a lamp fixing member of the backlight assembly in FIG. 1. FIG. 3 is a cross-sectional view illustrating the lamp fixing member taken along line I-I' in FIG. 2. FIG. 4 is an exploded perspective view illustrating the lamp fixing member in FIG. 2. FIG. 5 is an enlarged perspective view illustrating portion of "II" in FIG. 4.

Referring to FIGS. 2 to 5, the lamp fixing member 400 includes a first body part 410 and a second body part 420 combined with the first body part 410 by sliding toward the first body part 410.

The first body part 410 extends along the direction that is substantially perpendicular to the longitudinal direction of the lamps 300. The first body part 410 includes at least one first lamp fixing portion 411 that is disposed at the first body part 410. In one exemplary embodiment, the first body part 410 includes four first lamp fixing portions 411, as shown in FIG. 2. The four first lamp fixing portions 411 are spaced apart from each other by a specific distance.

The first lamp fixing portion 411 of the first body part 410 and a second lamp fixing portion 421 of the second body part 420 define a space 430, into which one of the lamps 300 are inserted, when the first and second body parts 410 and 420 are combined with each other.

The first lamp fixing portion 411 includes a first combining protrusion 412 for being stably combined with the second lamp fixing portion 421, as shown in FIG. 5.

The second body part 420 is mounted on the first body part 410 and is combined with the first body part 410, such as by sliding. As described above, the second body part 420 includes the second lamp fixing portion 421 that defines the space 430 for fixing the lamps 300 together with the first lamp fixing portion 411, the first and second body parts 410 and 420 being combined with each other. In one exemplary embodiment, the second body part 420 includes four of the second lamp fixing portions 421, as shown in FIG. 4. The four second lamp fixing portions 421 are spaced apart from each other by a specific distance.

When the first lamp fixing portion 411 is combined with the second lamp fixing portion 421, the first and second lamp fixing portions 411 and 421 may be considered to have a mirror symmetrical shape.

The second lamp fixing portion 421 includes a first combining groove (not shown) to be combined with the first combining protrusion 412 of the first lamp fixing portion 411. The first combining groove has a shape corresponding to the first combining protrusion 412.

When the first combining protrusion 412 of the first lamp fixing portion 411 and the first combining groove of the second lamp fixing portion 421 are combined with each other, the first and second body parts 410 and 420 are stably combined. In an alternative exemplary embodiment, the first lamp fixing portion 411 may include the first combining groove and the second lamp fixing portion 421 may include the first combining protrusion 412.

In order for the second body part 420 to slide and combine with the first body part 410, the second body part 420 fits on the first body part 410 to be on the same plane. Referring to FIG. 4, the second body part 420 includes a through-hole 422 that the first lamp fixing portion 411 passes through. A size of the through-hole 422 is determined by considering the size of the first lamp fixing portion 411 and the sliding distance of the second body part 420.

The second body part 420 may further include a second combining protrusion 423 for being combined with the first body part 410. The second combining protrusion 423 is protruded from the bottom surface of the second body part 420.

Referring o FIGS. 3 and 4, the first body part 410 may further include a second combining groove 413 for being combined with the second combining protrusion 423 of the second body part 420. The second combining protrusion 423 of the second body part 420 is combined with the second combining groove 413 of the first body part 410 by the sliding of the second body part 420. As described above, by the combination of the second combining protrusion 423 and the second combining groove 413 the first and second body parts 410 and 420 are more stably combined with each other.

In an alternative embodiment, the first body part 410 may include the second combining protrusion 423 and the second body part 420 may include the second combining groove 413.

The second body part 420 further includes a diffusion plate supporting portion 424 that protrudes such that a height of the diffusion plate supporting portion 424 is larger than that of the second lamp fixing portion 421 to support the diffusion plate 350. The larger the diffusion plate 350 is, the lower the middle portion of the diffusion plate 350 may sag. Therefore, the diffusion plate supporting portion 424 reduces or effectively prevents the sagging of the diffusion plate 350. The diffusion plate supporting portion 424 maintains the distance between the diffusion plate 350 and the lamps 300 that are fixed by the first and second lamp fixing portions 411 and 421. In exemplary embodiments, the diffusion plate supporting portion 424 may have substantially a cone shape. Any of a number of shapes of the diffusion plate supporting portion 424 may be used as is suitable to reduces or effectively prevents the sagging of the diffusion plate 350.

The first body part 410 may further include at least one body combining portion 414 formed on the bottom surface thereof for being combined with the receiving container 200. In an exemplary embodiment, the body combining portion 414 passes through an open portion of the bottom plate 210 of the receiving container 200 and is combined with the bottom plate 210, such as by hook combining. In exemplary embodiments, the number and the position of the body combining portion 414 may be variable as is suitable for combining the lamp fixing member 400 to the receiving container 200.

In exemplary embodiments, the first and second body parts 410 and 420 may include the same material. In one exemplary embodiment, the first and second body parts 410 and 420 may include plastic.

Figure 6:
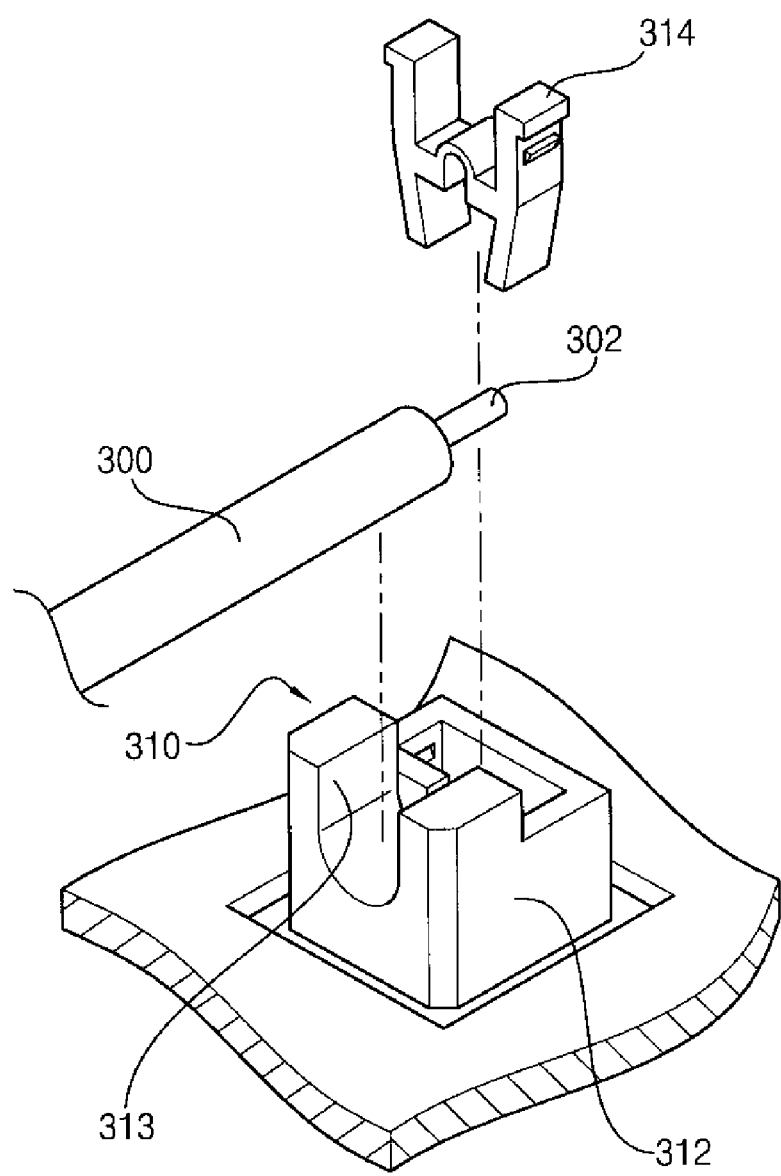
FIG. 6 is an exploded perspective view illustrating an exemplary embodiment of a lamp socket of the backlight assembly in FIG. 1.

FIG. 6 is an exploded perspective view illustrating an exemplary embodiment of a lamp socket of the backlight assembly in FIG. 1.

Referring to FIGS. 1 and 6, the lamp socket 310 mounts on a printed circuit board ("PCB") in a quantity corresponding to the number of lamp 300. The lamp socket 310 is disposed at the inner part of a receiving container 200 through an opening portion of the receiving container 200.

The lamp socket 310 includes a socket body part 312 and a socket fixing part 314. The socket body part 312 includes a lamp hole 313 into which the lamp 300 is inserted to be fixed. The lamp 300 is disposed at the socket body part 312 and the socket fixing part 314 is combined with the socket body part 312 to fix a lead line 302 of the lamp 300. The lead line 302 of the lamp 300 is combined with an electric pad (not shown) disposed at the inner portion of the socket body part 312.

Figure 7:
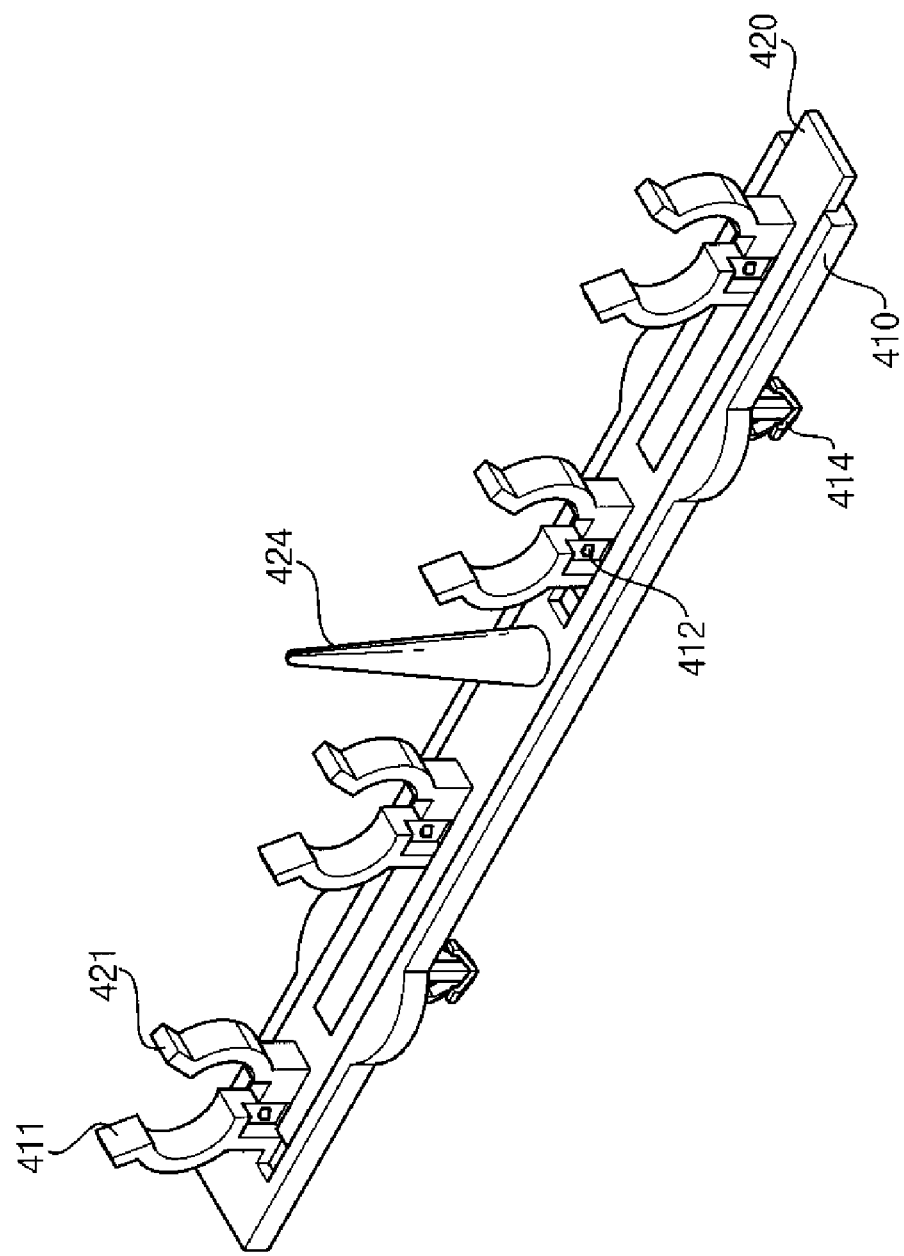
FIG. 7 is a perspective view illustrating an exemplary embodiment of a step of combining body parts of a lamp fixing member to fix a lamp in accordance with the present invention.

FIG. 7 is a perspective view illustrating an exemplary embodiment of a step of combining body parts of a lamp fixing member to fix a lamp in accordance with the present invention.

Referring to FIGS. 1, 6 and 7, the process for fixing the lamp 300 may be automatically performed by an automated assembly machine.

A lamp fixing member 400 that includes a first body part 410 and a second body part 420 combined with each other is combined with a receiving container 200. The lamp sockets 310 are combined with the receiving container 200. When the first and second body parts 410 and 420 are not slid to be combined with each other, the first and second lamp fixing portions 411 and 421 may maintain the status that is open such that a distance between the first and second lamp fixing portions 411 and 421 is larger than the diameter of the lamp 300. Also, a socket fixing part 314 of the lamp socket 310 may not yet combined with a socket body part 312.

The lamps 300 are disposed on the open first and second lamp fixing portions 411 and 421 such as through the automated machine. Both end portions of the lamps 300 are disposed on the socket body part 312 of the lamp socket 310.

The second body part 420 slides to be combined with the first body part 410 and a portion of the lamp 300 is fixed by the first and second body parts 410 and 420. Where the lamp fixing member 400 is disposed proximate to a center of the receiving container 200, a middle portion of the lamp 300 is fixed by the first and second body parts 410 and 420. Also, the socket fixing part 314 of the lamp socket 310 is combined with the socket body part 312 and fixes the lead line 302 of the lamp 300.

Advantageously, the lamps 300 may be fixed through an automated process, such that the method of fixing a lamp 300 may be simplified and the working time of fixing a lamp 300 may be reduced.

Figure 8:
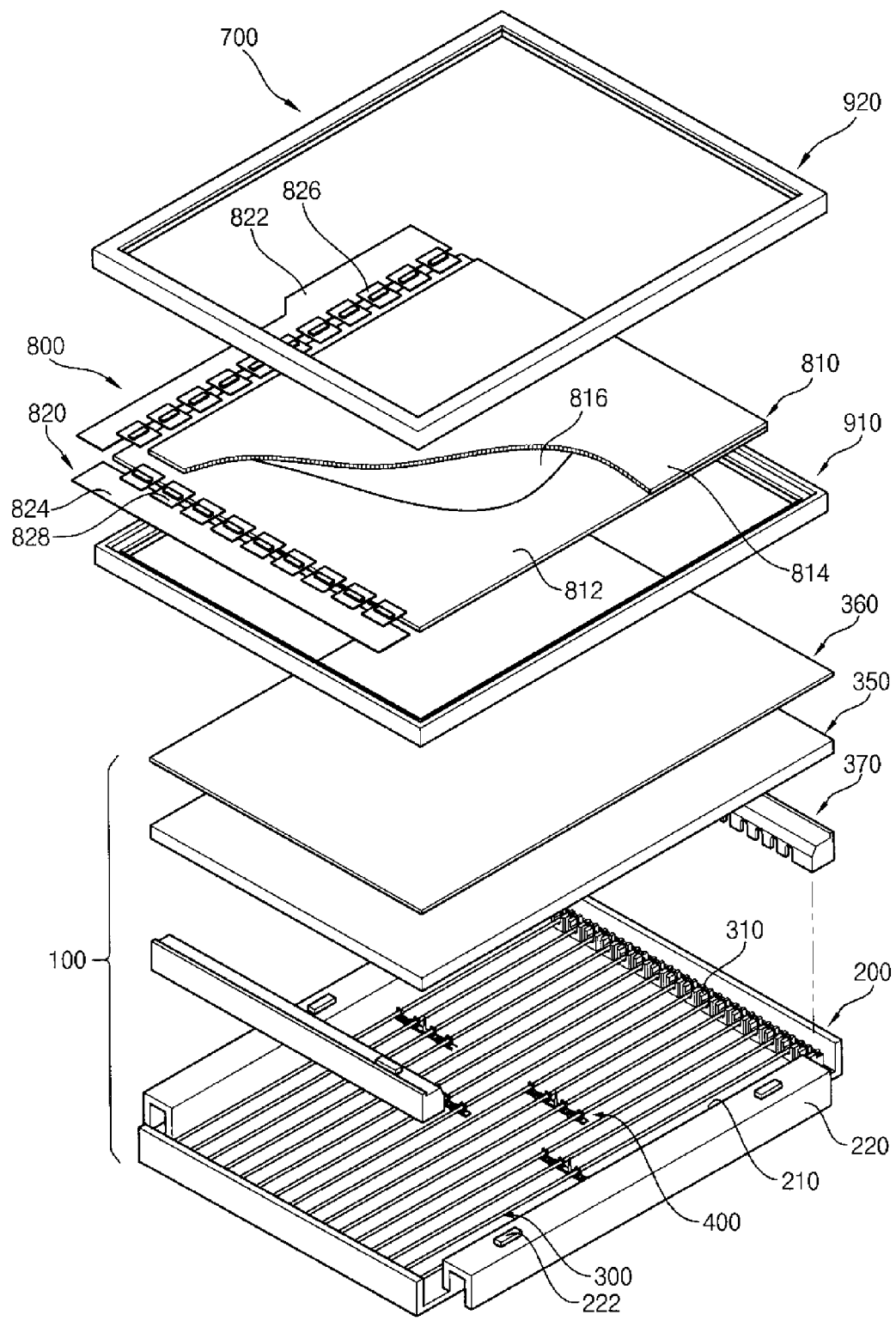
FIG. 8 is an exploded perspective view illustrating an exemplary embodiment of an LCD apparatus in accordance with the present invention.

FIG. 8 is an exploded perspective view illustrating an exemplary embodiment of an LCD apparatus in accordance with the present invention.

Referring to FIG. 8, the LCD apparatus 700 includes a backlight assembly 100 supplying the light, a display unit 800 displaying images and a top chassis 920 fixing the display unit 800.

The backlight assembly 100 illustrated in FIG. 8 is substantially the same as the backlight assembly in FIG. 1 to FIG. 7. Thus, the same reference numerals will be used to refer to the same or like parts as those described in the above-explained embodiment in FIG. 1 to FIG. 7, and any further explanations will be omitted.

The display unit 800 includes a liquid crystal display panel 810 and a driving circuit portion 820. The liquid crystal display panel 810 displays the images by using the light provided from the backlight assembly 100. The driving circuit portion 820 drives the liquid crystal display panel 810.

The liquid crystal display panel 810 includes a first substrate 812, a second substrate 814 and a liquid crystal layer 816. The second substrate 814 combined with the first substrate 812 such that the second substrate 814 faces the first substrate 812. The liquid crystal layer 816 is disposed between the first and second substrates 812 and 814.

The first substrate 812 includes a plurality of thin film transistors (not shown) arranged in a matrix shape. In one exemplary embodiment, the first substrate 812 may include glass. A gate electrode of each of the thin film transistors is electrically connected to one of the gate lines on the glass substrate. A source electrode of each of the thin film transistors is electrically connected to one of the data lines on the glass substrate. A drain electrode of each of the thin film transistors is electrically connected to a pixel electrode that includes an optically transparent and electrically conductive material.

The second substrate 814 may be a color filter substrate. In exemplary embodiments, the color filter substrate may include red, green and blue color filters and expresses the color. In one exemplary, the second substrate 814 may include glass. The second substrate 814 may further include a common electrode that includes an optically transparent and electrically conductive material.

When gate and data signals are applied to the gate and source electrodes of each of the thin film transistors, respectively, the thin film transistor is turned on to generate an electric field between the pixel electrode and the common electrode. An arrangement of liquid crystal molecules of the liquid crystal layer 816 is changed in response to the electric field applied thereto and thus a light transmittance of the liquid crystal layer 816 is changed to display the images.

The driving circuit portion 820 includes a data printed circuit board ("PCB") 822, a gate PCB 824, a data driving circuit film 826 and a gate driving circuit film 828. The data PCB 822 applies the data driving signal to the LCD panel 810. The gate PCB 824 applies the gate signal to the LCD panel 810. The data PCB 822 is electrically connected to the LCD panel 810 through the data driving circuit film 826. The gate PCB 824 is electrically connected to the LCD panel 810 through the data driving circuit film 828.

In exemplary embodiments, each of the data and gate driving circuit films 826 and 828 may include a driving chip. In one exemplary embodiment, each of the data and gate driving circuit films 826 and 828 may include a tape carrier package ("TCP"), a chip on film ("COF"), etc.

The data driving circuit film 826 may be bent toward a lower surface of the receiving container 200 along a side surface of the receiving container 200, so that the data PCB 822 is ultimately disposed on the side surface and lower surface of the receiving container 200. The gate PCB 824 may be bent toward the lower surface of the receiving container 200, so that the gate PCB 824 is ultimately disposed on the side surface and the lower surface of the receiving container 200. In an exemplary embodiment, an auxiliary signal line (not shown) may be formed on the LCD panel 810 and the gate flexible circuit film 828, so that the gate PCB 824 may be omitted.

The liquid crystal display apparatus 700 further includes a middle mold 910. The middle mold 910 is disposed between an optical sheet 360 and the liquid crystal display panel 810. The middle mold 910 fixes the optical sheet 360 and a diffusion plate 350 and supports the liquid crystal display panel 810. In exemplary embodiments, the middle mold 910 may have a one piece structure having a substantially frame shape. In an alternative embodiment, the middle mold 910 may be divided into two pieces, each of the pieces having a U-shape. In another alternative embodiment, the middle mold 910 may be divided into four pieces, each of the pieces having an L-shape.

The top chassis 920 covers an edge portion of the liquid crystal display panel 810 and is combined with the receiving container 200 to fix the liquid crystal display panel 810 on the middle mold 910. The top chassis 920 protects the liquid crystal display panel 910 from an external impact. The top chassis 920 reduces or effectively prevents the liquid crystal display panel 810 from being separated from the middle mold 910. In exemplary embodiments, the top chassis 920 may have one piece structure having the frame shape. In an alternative embodiment, the top chassis 920 may be divided into two pieces, each of the pieces having a U-shape. In another alternative embodiment, the top chassis 920 may be divided into four pieces, each of the pieces having an L-shape.

As in the illustrated exemplary embodiments, a lamp is fixed through an automated process, so that the simplicity of fixing the lamp is enhanced and the working time of fixing the lamp is reduced.

This invention has been described with reference to the example embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A lamp fixing member comprising:
   a first body part including at least one first lamp fixing portion disposed on an upper surface of the first body part; and
   a second body part being slidably combined with the first body part, the second body part including a second lamp fixing portion being combined with the first lamp fixing portion and defining a space through which a lamp is inserted to be fixed.

2. The lamp fixing member of claim 1, wherein the first and second lamp fixing portions have a symmetrical shape with respect to the lamp.

3. The lamp fixing member of claim 1, wherein the first lamp fixing portion comprises a first combining protrusion and the second lamp fixing portion comprises a first combining groove combined with the first combining protrusion by the sliding of the second body part.

4. The lamp fixing member of claim 1, wherein the second body part further including a through-hole through which the first lamp fixing portion passes.

5. The lamp fixing member of claim 1, wherein the first body part further comprises a body combining portion formed on a bottom surface of the first body part being combined with a receiving container.

6. The lamp fixing member of claim 1, wherein the second body part further comprises a second combining protrusion protruded from a bottom surface of the second body part, the second combining protrusion being combined with the first body part.

7. The lamp fixing member of claim 6, wherein the first body part further includes a second combining groove combined with the second combining protrusion by the sliding of the second body part.

8. The lamp fixing member of claim 1, wherein the second body part further comprises a diffusion plate supporting portion protruding such that a height of the diffusing plate supporting portion is larger than a height of the second lamp fixing portion.

9. The lamp fixing member of claim 8, wherein the diffusion plate supporting portion has a cone shape.

10. A backlight assembly comprising:
a receiving container;
a plurality of lamps arranged parallel with each other on the receiving container; and
a lamp fixing member including:
a first body part including at least one first lamp fixing portion disposed on an upper surface of the first body part; and
a second body part being slidably combined with the first body part, the second body part including a second lamp fixing portion being combined with the first lamp fixing portion and defining a space through which a lamp is inserted to be fixed.

11. The backlight assembly of claim 10, wherein the first and second lamp fixing portions have a symmetrical shape with respect to the lamp.

12. The backlight assembly of claim 10, wherein the first lamp fixing portion comprises a first combining protrusion and the second lamp fixing portion comprises a first combining groove combined with the first combining protrusion by the sliding of the second body part.

13. The backlight assembly of claim 10, wherein the second body part further includes a through-hole through which the first lamp fixing portion passes.

14. The backlight assembly of claim 10, wherein the second body part further comprises a second combining protrusion protruded from a bottom surface of the second body part, the second combining protrusion being combined with the first body part and the first body part further includes a second combining groove combined with the second combining protrusion by the sliding of the second body part.

15. The backlight assembly of claim 10, wherein the first body part further comprises a body combining portion formed on a bottom surface of the first body part being combined with the receiving container.

16. The backlight assembly of claim 10, further comprising a diffusion plate disposed on the lamps.

17. The backlight assembly of claim 16, wherein the second body part further comprises a diffusion plate supporting portion supporting the diffusion plate and protruding such that a height of the diffusing plate supporting portion is larger than that of a height of the second lamp fixing portion.

18. A liquid crystal display apparatus comprising:
a backlight assembly providing light, the backlight assembly including:
a receiving container;
a plurality of lamps being parallel with each other on the receiving container; and
a lamp fixing member including:
a first body part including at least one first lamp fixing portion disposed on an upper surface of the first body part; and
a second body part being slidably combined with the first body part, the second body part including a second lamp fixing portion being combined with the first lamp fixing portion, the combined second lamp fixing portion and the first lamp fixing portion defining a space wherein a lamp is fixed;
a display unit on the backlight assembly and displaying images; and
a top chassis fixing the display unit.

19. The liquid crystal display apparatus of claim 18, wherein the first and second lamp fixing portions have a symmetrical shape with respect to the lamp.

20. The liquid crystal display apparatus of claim 18, wherein the first lamp fixing portion comprises a first combining protrusion and the second lamp fixing portion comprises a first combining groove combined with the first combining protrusion by the sliding of the second body part.

21. The liquid crystal display apparatus of claim 18, wherein the second body part further comprises a second combining protrusion being combined with the first body part and the first body part further comprises a second combining groove combined with the second combining protrusion by the sliding of the second body part.

22. The liquid crystal display apparatus of claim 18, wherein the second body part further includes a through-hole through which the first lamp fixing portion passes.

23. The liquid crystal display apparatus of claim 18, wherein the second body part further comprises a diffusion plate supporting portion supporting a diffusion plate, the diffusion plate supporting portion protruding higher from an upper surface of the second body part than the second lamp fixing portion.

24. A method of forming a backlight assembly, the method comprising:
partially assembling a fixing member including a first body part and a second body part, the first body part including a first lamp fixing portion disposed on an upper surface of the first body part and the second body part including a second lamp fixing portion disposed on an upper surface of the second body part, wherein the first lamp fixing portion and the second lamp fixing portion define an opening having a distance larger than a diameter of a lamp;
inserting the lamp in the opening; and
slidably assembling the first body part and the second body part, wherein the lamp is fixedly disposed between the first lamp fixing portion and the second lamp fixing portion.

25. The method of claim 24, wherein the partially assembling a fixing member comprises inserting the first lamp fixing portion through a through-hole in the second body part and combining the first body part and the second body part with a receiving container.

26. The method of claim 25, wherein the inserting the lamp comprises disposing end portions of the lamp into a lamp socket disposed in the receiving container.

27. The method of claim 26, further comprising combining a socket fixing part with the lamp socket and fixedly disposing the lamp in the lamp socket.

28. The method of claim 26, wherein the slidably assembling the first body part and the second body part comprises combining a first combining protrusion on the first lamp fixing portion and a first combining groove on the second lamp fixing portion.

29. The method of claim 28, wherein the slidably assembling the first body part and the second body part further comprises combining a second combining protrusion protruded from a bottom surface of the second body part with a second combining groove in the first body part.

* * * * *